Aug. 10, 1926.
H. MAUTNER
ATTACHMENT FOR VEHICLES
Filed Dec. 7, 1925
1,595,111
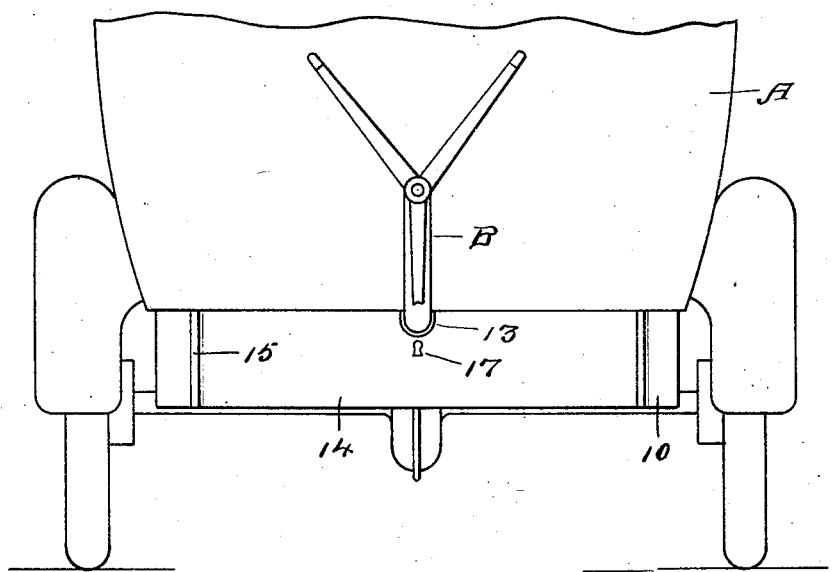
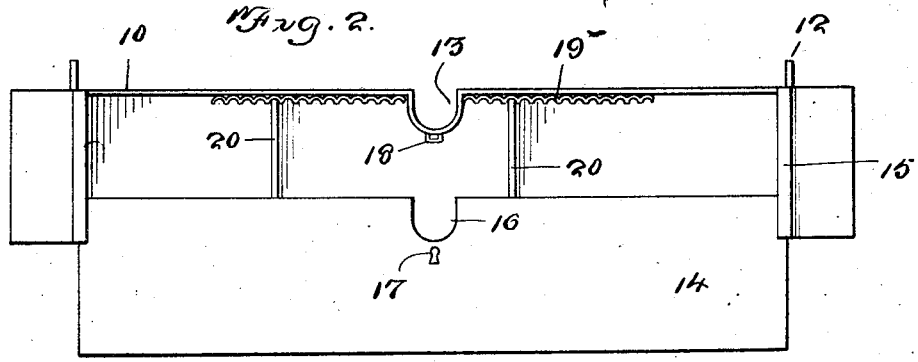
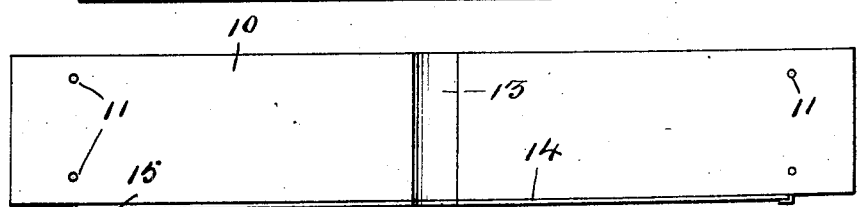
Henry Mautner, INVENTOR Patented Aug. 10, 1926.

1,595,111

UNITED STATES PATENT OFFICE.

HENRY MAUTNER, OF NEW YORK, N. Y.

ATTACHMENT FOR VEHICLES.

Application filed December 7, 1925. Serial No. 73,819.

This invention relates to automobile attachments, and contemplates the provision of a receptacle designed to be mounted at the rear of a machine, occupying the space directly beneath the tire carrier, and adapted to carry various articles as well as to add to the general appearance of the machine.

In carrying out the invention I provide a receptacle including a plurality of adjustable partitions, which can be arranged to divide the receptacle into compartments of any desired size, the front wall of the receptacle being mounted for sliding movement whereby access to the receptacle can be readily had.

The nature and advantages of the invention will be readily apparent when the following detailed description is read in connection with the accompanying drawing, the invention residing in the construction, combination and arrangement of parts as claimed.

In the drawing forming part of this application, like numerals of reference indicate similar parts throughout the several views, and wherein:

Figure 1 is a rear elevation of a machine showing the application of the invention.

Figure 2 is a front elevation of the receptacle showing the front wall lowered.

Figure 3 is a top plan view.

As hereinabove stated, the invention is primarily intended for use on automobiles, and consists in the use of a box adapted to be arranged in the space at the rear of the car directly beneath the tire carrier, which space is usually occupied by the gasoline tank on higher priced cars. The box or receptacle is not only useful to receive various articles, but by filling up the space above indicated, the presence of the box materially adds to the general appearance of the machine. The box or receptacle is indicated at 10, and may be secured to the body A of the machine in any suitable manner, the top of the box being provided with openings 11 through which fastening elements may pass for this purpose. The fastening elements are indicated at 12 in Figure 2. The box is preferably of rectangular contour in cross section, although it might be stated that the same can vary in size and configuration without departing from the spirit of the invention. The upper wall of the box is recessed transversely thereof, as at 13, to receive the adjacent arm of the tire carrier indicated generally at B, thus allowing the box to be properly positioned in close proximity to the body of the machine. The front wall 14 of the box is mounted to slide in suitable guides 15 arranged at the ends thereof, thereby allowing the front wall to be raised or lowered as the occasion may require, the wall when lowered as shown in Figure 2 permitting access to be readily had to the interior of the box. This wall is also provided with a notch or depression 16 which is adapted to aline with the depression 13 when in normal position to receive the adjacent arm of the tire carrier. Any suitable means may be employed for locking the wall 14 in its normal position, preferably a key actuated mechanism being employed, the keyhole being arranged in the wall 14 and indicated at 17. The lock mechanism itself is indicated generally at 18. Arranged within the box and secured to the upper and lower walls thereof are corrugated strips of any suitable material indicated at 19, which are employed to receive and support partitions 20, and allow these partitions to be arranged any distance apart with a view of varying the size or capacity of the different compartments defined by the partitions. Any number of partitions may be used as found desirable.

While it is believed that from the foregoing description the nature and advantages of the invention will be readily apparent, I desire to have it understood that I do not limit myself to what is herein shown and described, and that such changes may be made when desired as fall within the scope of what is claimed.

Having thus described the invention, what is claimed as new, is:—

An automobile attachment comprising an elongated receptacle adapted to be arranged at the rear of the vehicle body immediately beneath the tire carrier thereon, said receptacle having spaced openings in the top thereof, fastening elements projecting through said openings above the top and adapted to secure the receptacle against the vehicle body, spaced angular-shaped guides arranged vertically on the front of the receptacle, said receptacle including a front wall mounted for vertical sliding movement between said guides to permit access to be had to the receptacle, means for locking the front wall in a normal closed position, the top of the receptacle and said front wall having alined depressions adapted to receive the adjacent portion of the tire carrier, and partitions dividing the receptacle into compartments.

In testimony whereof I affix my signature.

HENRY MAUTNER.